United States Patent
Vermonet et al.

(10) Patent No.: US 6,854,441 B2
(45) Date of Patent: Feb. 15, 2005

(54) SYSTEM FOR CONTROLLING THE COMBUSTION NOISE A MOTOR VEHICLE DIESEL ENGINE

(75) Inventors: Claire Vermonet, Paris (FR); Guillaume Meissonnier, Gaulois (FR); Cédric Lorret, Paris (FR); Yvon Bauge, Rungis (FR)

(73) Assignees: Peugeot Citroen Automobiles SA, Velizy-Villacoublay (FR); Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/885,025

(22) Filed: Jul. 7, 2004

(65) Prior Publication Data

US 2005/0005902 A1 Jan. 13, 2005

(30) Foreign Application Priority Data

Jul. 8, 2003 (FR) .............................................. 0308351

(51) Int. Cl.$^7$ ................................................. F02B 3/00
(52) U.S. Cl. ....................................... 123/299; 123/294
(58) Field of Search ................................. 123/294, 299, 123/300, 305

(56) References Cited

U.S. PATENT DOCUMENTS 6,363,914 B1 * 4/2002 Tanabe et al. .............. 123/447

FOREIGN PATENT DOCUMENTS

| EP | 1 128 050 | 8/2001 |
|---|---|---|
| EP | 1 219 805 | 7/2002 |
| EP | 1 316 704 | 6/2003 |
| EP | 1 316 709 | 6/2003 |

* cited by examiner

Primary Examiner—Bibhu Mohanty
(74) Attorney, Agent, or Firm—Westerman, Hattori, Daniels & Adrian LLP

(57) ABSTRACT

This system for controlling the combustion noise of a motor vehicle diesel engine of the type including means for feeding each of its cylinders with fuel by multiple injections of fuel, which means are adapted to trigger fuel feed into each cylinder in the form of at least one pilot injection and a main injection of fuel, comprises:

- means for determining pressure gradients in the engine cylinder while in operation, at least during the pilot and main injection stages; and
- means for determining the quantity of fuel to be injected into the cylinder during pilot injection for a predetermined quantity of fuel injected during main injection so as to optimize a criterion based on the ratio between the pressure gradients corresponding to the pilot and main injection stages, thereby optimizing the operating noise of the engine.

12 Claims, 4 Drawing Sheets

US 6,854,441 B2

SYSTEM FOR CONTROLLING THE COMBUSTION NOISE A MOTOR VEHICLE DIESEL ENGINE

TECHNICAL FIELD OF THE INVENTION

The present invention relates to a system for controlling the combustion noise of a motor vehicle diesel engine.

More particularly, the system relates to optimizing the injection setpoint for a diesel engine that includes means, e.g. a common delivery pipe, for feeding fuel to the engine in the form of multiple injections of fuel into each cylinder thereof in order to minimize the combustion noise.

BACKGROUND OF THE INVENTION

The present defects of this type of injection system for diesel engines lie firstly in a dispersion of engine characteristics on leaving the factory, e.g. due to manufacturing tolerances and to the extremely high pressures of the system, and secondly to drift over time in the delivery characteristics of the injectors, while the vehicle is in use. Furthermore, over its lifetime, the engine's own characteristics vary, for example the compression ratio in the cylinders, and the permeability of the valves or of the piston rings, thus altering the thermodynamic conditions of combustion. The sum of these drifts leads to degradation of the combustion noise of the engine that is perceived directly by the user of the vehicle.

In the state of the art, various systems are already known that seek to reset the injection system over the lifetime of the engine so as to ensure that the quantities injected correspond to the reference value. For example, patent EP 0 959 237 B1 presents a method of adjusting the time between top dead center and injection by using an accelerometer. Other methods are known for resetting pilot rates that are based on engine speed sensors.

Systems are also known to seek to modify the quantities of fuel injected into the cylinders by taking account of such drift in order to correct degradation of combustion noise on a regular basis. Those injection systems are adapted to inject fuel into the engine cylinders in the form of at least one pilot injection and a main injection.

The pilot injection serves to inject a small quantity of fuel a few milliseconds (ms) before the main injection fuel for the purpose of minimizing combustion noise. This small quantity of fuel favorably conditions the ignition characteristics of the quantity of fuel that is injected during main ignition by reducing the pressure gradients that are responsible for combustion noise.

Systems are known for controlling the operation of a diesel engine by controlling said pilot injection. Such systems propose modifying the quantities of fuel that are injected during pilot injection so as to minimize combustion noise on the basis of calculating a combustion noise score referred to as the combustion pressure energy index (CPEI) system. Nevertheless, such systems present several drawbacks since noise score calculation makes use of a model of the engine and a model of the human ear.

That assumes that the real behavior of the engine can be approximated by a mathematical model, which introduces errors. In order to reduce the amplitude of such errors, it becomes necessary to increase the complexity of the model, thereby having the consequence, not only of increasing computation time, but also of increasing the complexity of the system itself, in particular in terms of memory size and computation power of the on-board controller.

In addition, by the very nature of the problem, the engine model used can become obsolete since the characteristics of the engine change over time, implying that the model is no longer representative after a certain length of time, unless its parameters are regularly updated, which likewise involves an increasing degree of complexity.

Furthermore, using a model of the human ear implies the additional disadvantage of assuming that there is only one model that is applicable to the hearing behavior of all users.

That approach requires very long computation time since it makes use of complex digital filtering. In addition, the values obtained are dispersed very widely, which requires a large number of cycles to be averaged before a value can be obtained that is suitable for use in controlling injection.

In order to increase the reliability with which combustion noise is minimized, one solution then consists in making use of a different combustion noise score.

For this purpose, European patent application EP-A-1 209 458 relates to a method of determining combustion noise by using the wavelet method. That method does indeed avoid using a model of the human ear, and it does not make direct use of an engine model when calculating the noise score. However, that method remains difficult to apply in simple manner. That approach remains an approach that is based on a mathematical model of the engine, if only for the purpose of selecting the basis functions to use, and it is consequently subject to the same drawbacks as are associated with using a model. Finally, that approach remains expensive in computation time since it requires several successive digital filtering operations in order to obtain information that is useful for controlling injection. In addition, the dispersion in individual values is even greater than with the "CPEI" method.

SUMMARY OF THE INVENTION

The object of the present invention is to solve the above-mentioned problems by proposing an approach that is not based on a model, and that is effective in minimizing combustion noise, that can be applied simply and at very low cost in terms of computation complexity and time.

To this end, the invention provides a system for controlling the combustion noise of a motor vehicle diesel engine, the engine being of the type including feeding means for feeding each of its cylinders with multiple injections of fuel, and adapted to trigger fuel feed to each cylinder using at least one pilot injection followed by a main injection of fuel, wherein the system comprises:

means for determining pressure gradients in the cylinder of the engine while it is in operation, at least during the pilot and main injection stages; and means for determining the quantity of fuel to be injected into the cylinder during pilot injection for a predetermined quantity of fuel to be injected during main injection so as to optimize an operating criterion of the cylinder based on the ratio between the pressure gradients corresponding to the pilot and main injection stages, and thus optimize the operating noise of the engine.

According to another characteristic, the means for determining the quantity of fuel to be injected into the cylinder during pilot injection are adapted to implement an optimization algorithm to determine a quantity of fuel per cylinder during pilot injection according to the following relationships:

$$\min_{q_{pil} \in Q_{pri}} \left| \frac{\max\left(\frac{\partial P}{\partial \alpha_{pil}}\right)}{\max\left(\frac{\partial P}{\partial \alpha_{pri}}\right)} - k \right|$$

$$f\left(\max\left(\frac{\partial P}{\partial \alpha_{pil}}\right), \max\left(\frac{\partial P}{\partial \alpha_{pri}}\right)\right) < 0$$

where $q_{pil}$ is the quantity of fuel injected into a cylinder during pilot injection, $Q_{pil}$ is a predetermined range of acceptable values for $q_{pil}$, $\alpha$ is the crank shaft angle of the cylinder, $$\frac{\partial P}{\partial \alpha_{pil}}$$

is the pressure gradient in the cylinder during the pilot injection stage of the cylinder cycle, $$\frac{\partial P}{\partial \alpha_{pri}}$$

is the pressure gradient in the cylinder during the main injection stage of the cylinder cycle, k is a reference value for the ratio $$\frac{\max\left(\frac{\partial P}{\partial \alpha_{pil}}\right)}{\max\left(\frac{\partial P}{\partial \alpha_{pri}}\right)},$$

and $$f\left(\max\left(\frac{\partial P}{\partial \alpha_{pil}}\right), \max\left(\frac{\partial P}{\partial \alpha_{pri}}\right)\right) < 0$$

is a function characteristic of a predetermined allocation zone of acceptable values for the pair of values $$\left(\max\left(\frac{\partial P}{\partial \alpha_{pil}}\right), \max\left(\frac{\partial P}{\partial \alpha_{pri}}\right)\right).$$

According to another characteristic, the means for determining the quantity of fuel to be injected into the cylinder during pilot injection are adapted to implement an optimization algorithm which comprises:

a step of acquiring at least one pressure gradient signal representative of variation in the pressure gradient during a cylinder cycle; for a constant quantity of fuel being injected during the pilot stage;

a step of calculating a value $\overline{R}$ representative of the ratio $$\frac{\max\left(\frac{\partial P}{\partial \alpha_{pil}}\right)}{\max\left(\frac{\partial P}{\partial \alpha_{pri}}\right)}$$

for the cylinder and the constant quantity of injected fuel considered as a function of at least one acquired pressure gradient signal; and a step of determining variation in the quantity of fuel injected into the cylinder during the pilot stage as a function of the calculated value $\overline{R}$, in application of a predetermined relationship for travel through the predetermined set of acceptable values for the quantity of fuel injected during pilot injection.

According to another characteristic, the relationship for travel through the predetermined set of acceptable values of quantities of fuel for injection during pilot injection is determined by the characteristics of a thermodynamic model using the relationship:

$$\max\left(\frac{\partial P}{\partial \alpha_{pri}}\right) = h\left(\max\left(\frac{\partial P}{\partial \alpha_{pil}}\right)\right)$$

where h is the thermodynamic model representative of variation in the value of the pressure gradient maximum in a cylinder during the main injection stage as a function of the values of the pressure gradient maximum in the cylinder during the pilot injection stage.

According to another characteristic, the system includes a pressure sensor associated with each cylinder and connected to the means for determining pressure gradients.

According to another characteristic, the system includes means for acquiring the engine shaft angle, which means are connected to the means for determining pressure gradients.

According to another characteristic, the means for determining pressure gradients comprise:

signal selection means for selecting a cylinder pressure signal selected from a plurality of cylinder pressure signals;

acquisition windowing means for acquiring the selected cylinder pressure signal delivered by the associated pressure sensor while the cylinder crank shaft angle lies within a predetermined acquisition range of crank shaft angles representative of the pilot injection stage and the main injection stage of the cylinder cycle;

an analog-to-digital converter for sampling the pressure signal output by the windowing means in application of a predetermined sampling relationship; and a differentiation digital filter adapted to determine a digital derivative of the sampled pressure signal and thus obtain the cylinder pressure gradient signal.

According to another characteristic, the digital filter is a digital filter having finite impulse response.

According to another characteristic, the means for determining the quantity of fuel for injection into the cylinder comprise calculation means adapted to calculate and store on each cylinder cycle: the value $$\max\left(\frac{\partial P}{\partial \alpha_{pil}}\right)$$

as being the maximum value of the pressure gradient signal in the crank shaft angle range between the beginning of the acquisition crank shaft angle range and the advance angle for main injection; the value $$\max\left(\frac{\partial P}{\partial \alpha_{pri}}\right)$$

as being the maximum value of the pressure gradient signal in the crank shaft angle range between said main injection advance angle and the end of the acquisition crank shaft angle range; and the value of the ratio $$R = \frac{\max\left(\frac{\partial P}{\partial \alpha_{pil}}\right)}{\max\left(\frac{\partial P}{\partial \alpha_{pri}}\right)}.$$

According to another characteristic, the function characteristic of the predetermined allocation zone is determined as a function of an operating noise score of the engine depending on the pressure gradients corresponding to the pilot and main injection stages in accordance with the relationship:

$$\text{Score} = \alpha + \beta \times \max\left(\max\left(\frac{\partial P}{\partial \alpha_{pil}}\right), \max\left(\frac{\partial P}{\partial \alpha_{pri}}\right)\right)$$

where $\alpha$ and $\beta$ are experimentally-determined parameters.

According to another characteristic, the means for determining the quantity of fuel to be injected into the cylinder during pilot injection are adapted to determine sequentially the quantity of fuel to be injected into each cylinder independently of the others.

According to another characteristic, the system includes control means adapted to control the feed means to calculate the quantity of fuel to be injected during pilot injection in a cylinder in such a manner as to regulate the value of the ratio $$\frac{\max\left(\frac{\partial P}{\partial \alpha_{pil}}\right)}{\max\left(\frac{\partial P}{\partial \alpha_{pri}}\right)}$$

in the cylinder to around a reference value k so as to minimize operating noise of the engine.

BRIEF DESCRIPTION OF THE DRAWINGS

The present invention will be better understood on reading the following description given purely by way of example and made with reference to the accompanying drawings, in which identical references identify elements that are identical, and in which.

DETAILED DESCRIPTION OF THE EMBODIEMENTS

Figure 1B:
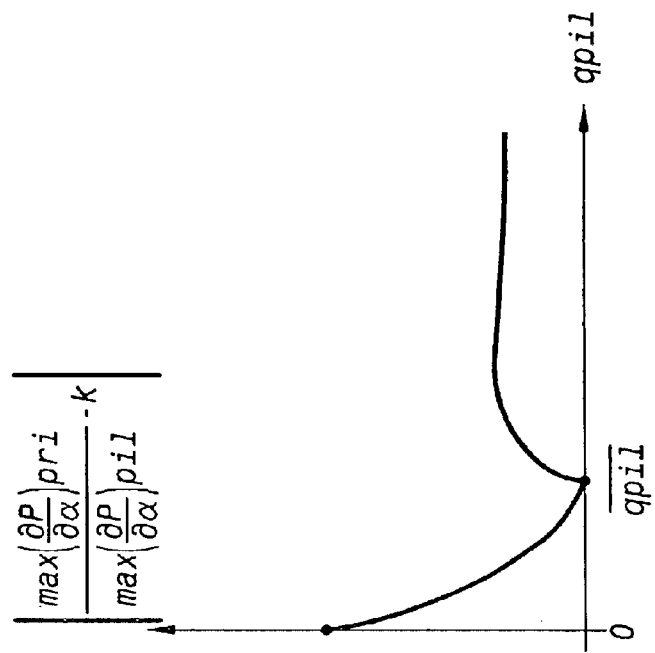
FIG. 1B shows a curve representing a criterion that is to be minimized, depending on the ratio of the maximum values of pressure gradient as a function of the injected pilot quantity.

As mentioned above, the amplitude of the combustion noise of an engine, and in particular a motor vehicle diesel engine, depends on the amplitude of the pressure gradient in the combustion chambers of the cylinder during ignition of the fuel. The pressure gradient amplitude is itself directly dependent on the initial conditions of ignition. For an engine fed with fuel that is injected in the form of at least one pilot injection and a main injection, the pilot injection enables favorable conditions to be prepared for the main combustion. Consequently, the less the combustion chamber has been prepared by a pilot injection at the beginning of ignition of the main quantity of fuel, the more sudden the increase in pressure due to said injection, and consequently the greater the amount of noise generated by the main combustion.

That is why, combustion noise depends not only on pressure gradient during the pilot injection stage, but also on pressure gradient during the main injection stage. In order to minimize combustion noise, it is therefore appropriate to calculate the pilot quantities for injection into the cylinders of the engine while taking account of the pressure gradient characteristics during both of those stages.

Increasing the pilot quantity of fuel decreases the amplitude of the pressure gradient on ignition of the main quantity of fuel. If the pilot quantity of fuel injected into a cylinder is such that the pressure gradient maximum during the pilot injection stage is substantially equal to the pressure gradient maximum during the main injection stage, then combustion noise in the cylinder is at a minimum.

A score for the combustion noise of a cylinder can be expressed by the following relationship $$\text{Score} = \lambda + \beta \times \max\left(\max\left(\frac{\partial P}{\partial \alpha_{pil}}\right), \max\left(\frac{\partial P}{\partial \alpha_{pri}}\right)\right) \quad (1)$$

or by the relationship:

$$\text{Score\_a} = \alpha - \tilde{\beta} \times \left(\log \frac{\max\left(\frac{\partial P}{\partial \alpha_{pil}}\right)}{\max\left(\frac{\partial P}{\partial \alpha_{pri}}\right)}\right)^2 \quad (1a)$$

where $\lambda$, $\beta$, $\alpha$, and $\tilde{\beta}$ are parameters determined during a listening campaign with a panel of experts, $$\frac{\partial P}{\partial \alpha_{pil}}$$

is the pressure gradient in the cylinder during the pilot injection stage in the cylinder cycle, $$\frac{\partial P}{\partial \alpha_{pri}}$$

is the pressure gradient in the cylinder during the main injection stage in the cylinder cycle, and $\alpha$ is the crank shaft angle of the cylinder in question.

The correlation between these combustion noise scores and a noise score delivered by the panel of experts is very high, regardless of the operating point of the engine in question. Thus, as can be seen considering the noise score in accordance with relationship (1a) above, in order to minimize the operating noise of the engine, or in equivalent manner in order to maximize the combustion noise score as given by above relationship (1a), it is necessary and sufficient to cause the ratio of pressure gradients that appears in the logarithmic term to tend towards 1, and this applies independently of the operating point of the engine, of the cylinder in question, or of the values of the mechanical and/or thermodynamic parameters of the engine. In order to ensure an acceptable level of pollution emissions and good robustness, in particular faced with the dispersion in individual values for pilot injection, it is particularly advantageous to cause the pressure gradient ratio to tend towards a value k that is not equal to 1, but that is characteristic of how the noise/emission/robustness compromise is calibrated.

Thus, the present invention proposes calculating, for at least one operating point of the engine and for one quantity of fuel injected during the main injection that is predetermined as a function of the operating point, a pilot quantity that is to be injected, and that is given as the solution of the following minimizing problem:

$$\min_{q_{pil} \in Q_{pil}} \left| \frac{\max\left(\frac{\partial P}{\partial \alpha_{pri}}\right)}{\max\left(\frac{\partial P}{\partial \alpha_{pil}}\right)} - k \right| \qquad (2)$$

where $q_{pil}$ is the quantity of fuel injected into the cylinder during pilot injection, $Q_{pil}$ is the predetermined set of acceptable values for $q_{pil}$, and k is a calibration value close to 1.

The pilot quantity, the combustion noise score given by relationship (1), are determined for a particular cycle and for a given operating point of the engine, i.e. a given engine speed and engine load. To cover the operating range of the engine, it is possible to determine a pilot quantity per cylinder for a plurality of operating points, as is known in the state of the art. Thus, the solution to the optimization problem is considered for a determined operating point and one cylinder.

The acceptable values for the pilot quantity can easily be characterized. Above a maximum injected pilot quantity $q_{pil}^{max}$, the consumption of fuel and the emission of pollution becomes too large for an improvement in combustion noise that is negligible or non-existent, or possibly even worsened. Similarly, it is known that below a certain minimum value for the injected pilot quantity $q_{pil}^{min}$, combustion noise is bound to be severely degraded. Thus, the set of acceptable values for the pilot quantity can be characterized simply by means of the range $[q_{pil}^{min}, q_{pil}^{max}]$. Naturally, there is nothing to prevent searching for the pilot quantity that is to be injected in the range $[0, q_{pil}^{max}]$.

In addition to calculating a pilot quantity that minimizes combustion noise by using a criterion that does not involve any model of the human ear, the present invention also avoids using any model of the engine when solving the above optimization problem, thereby obtaining the advantage that the invention is applicable to any engine independently of the values of its mechanical and/or thermodynamic characteristics, and is thus applicable independently of any variation in its characteristics.

Another non-negligible advantage of the optimization problem as given by relationship (2) is that the criterion which is to be minimized, i.e. the criterion $$\left| \frac{\max\left(\frac{\partial P}{\partial \alpha_{pri}}\right)}{\max\left(\frac{\partial P}{\partial \alpha_{pil}}\right)} - k \right|$$

is unimodal, i.e. it presents only a single minimum which is consequently a global minimum. Thus, determining the optimum pilot quantity can be done effective and quickly, and regardless of the desired level of accuracy for this value, as described in greater detail below.

Figure 1A:
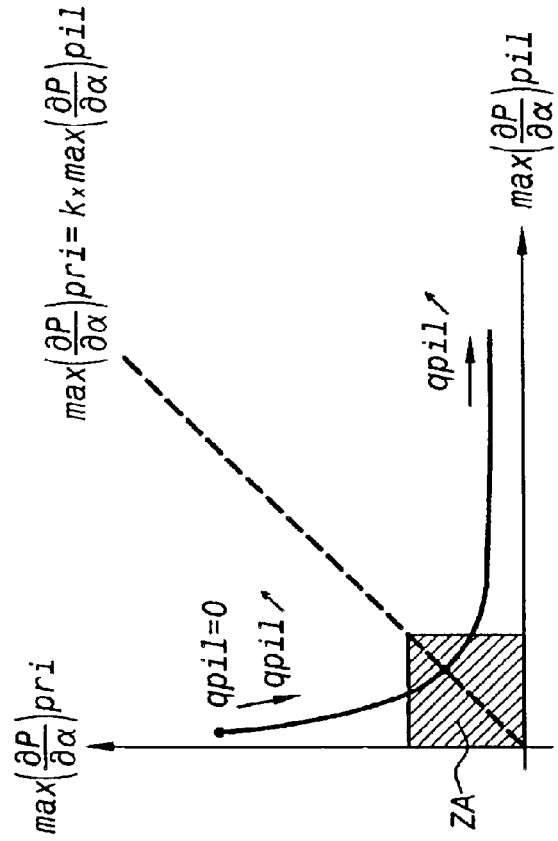
FIG. 1A shows a curve representative of the maximum values of the pressure gradient during the main injection stage as a function of the maximum values of the pressure gradient during the pilot injection stage, in a cylinder of the engine.

This can be understood by considering the variation in the pressure gradient maximum in a cylinder during the main injection stage as a function of the value of the pressure gradient maximum during the pilot injection stage as represented by the curve of FIG. 1A which is representative of a thermodynamic model according to the following relationship:

$$\max\left(\frac{\partial P}{\partial \alpha_{pri}}\right) = h\left(\max\left(\frac{\partial P}{\partial \alpha_{pil}}\right)\right) \qquad (3)$$

where h is the thermodynamic model representative of the variation in the value of the pressure gradient maximum in the cylinder during the main injection stage as a function of the value of the pressure gradient maximum in the cylinder during the pilot injection stage.

The appearance of the curve shown is conventional and this curve can be parameterized by the pilot quantity $q_{pil}$. Injecting an increasing pilot quantity corresponds to traveling along the curve in the direction of increasing values for the pressure gradient maximum during the pilot injection stage.

On the basis of these characteristics, it is possible to deduce therefrom quite simply the characteristic curve for the quantity $$\left| \frac{\max\left(\frac{\partial P}{\partial \alpha_{pri}}\right)}{\max\left(\frac{\partial P}{\partial \alpha_{pil}}\right)} - k \right|$$

as a function of $q_{pil}$, as shown in FIG. 1B. As can be seen, this curve is representative of a function that presents a single minimum corresponding to the optimum quantity for the pilot injection. It is possible to obtain this minimum in simple and certain manner, e.g. by implementing a simple gradient algorithm.

It is not necessary to know this function explicitly nor is it necessary to know the thermodynamic model h explicitly, since a search for the optimum quantity for pilot injection is based only on qualitative considerations. For example, as can be seen from the curve in FIG. 1A, if the value of the ratio is greater than k, it is known that the pilot quantity that is injected is not sufficient. The search for the optimum pilot quantity thus takes place from amongst pilot quantities that are greater. Similarly, if the value of the ratio is greater than k, it is known that the injected pilot quantity is too great and the search consequently takes place amongst pilot quantities that are smaller.

Relationship (2) can be combined with a feasibility constraint expressed as follows:

$$f\left(\max\left(\frac{\partial P}{\partial \alpha_{pil}}\right), \max\left(\frac{\partial P}{\partial \alpha_{pri}}\right)\right) < 0 \qquad (4)$$

where $$f\left(\max\left(\frac{\partial P}{\partial \alpha_{pil}}\right), \max\left(\frac{\partial P}{\partial \alpha_{pri}}\right)\right) < 0$$

is a function characteristic of a predetermined allocation zone for acceptable values for the pair of values $$\left(\max\left(\frac{\partial P}{\partial \alpha_{pil}}\right), \max\left(\frac{\partial P}{\partial \alpha_{pri}}\right)\right).$$

It is desirable that the values of these pressure gradient maxima to lie in a zone of values for ensuring proper operation of the engine. For example, when the gradients are less than calibratable low threshold values for the gradient, the engine does not operate properly and it is necessary to control it in a degraded mode.

It is also possible to imagine having a ratio equal to k, while still having maximum values for pressure gradient during the pilot and main injection stages that are greater than high threshold values for the gradient that are very large, which also leads to malfunction of the engine.

In order to characterize the top limits of the allocation zone, i.e. the high threshold values for the gradient, one technique is to use the combustion noise score given by relationship (1)

$$\text{Score} = \lambda + \beta \times \max\left(\max\left(\frac{\partial P}{\partial \alpha_{pil}}\right), \max\left(\frac{\partial P}{\partial \alpha_{pri}}\right)\right)$$

where λ and β are parameters determined experimentally during a listening campaign with a panel of experts and, by way of example, selecting a characteristic function or the allocation zone implementing the relationship:

$$f\left(\max\left(\frac{\partial P}{\partial \alpha_{pil}}\right), \max\left(\frac{\partial P}{\partial \alpha_{pri}}\right)\right) = \text{Score} - \gamma \quad (6)$$

where γ is a combustion noise threshold parameter determined during a listening campaign with a panel of experts.

These relationships may also be combined with relationships describing other engine characteristics, such as, for example, fuel combustion characteristics, pollution emission characteristics, etc.

It should be observed that the example of a combustion noise score as given by relationship (1) can be used in conventional systems for controlling diesel engine operation, where such systems are based on using a combustion noise score.

An example of an allocation zone is given by the shaded zone ZA of FIG. 1A. The infeasibility of the optimization problem given by relationships (2) and (4) thus leads to the diagnostic that the engine is in a degraded state, and more particularly that there is a problem of engine drift.

By solving the above-described optimization problem, it is simple to calculate the pilot quantity for a cylinder and for a determined operating point. It is then possible to design a system for controlling the operation of the diesel engine that has as its main purpose minimizing combustion noise from the cylinders. By selecting a number of (speed, load) operating points for the engine, and by regularly determining for each cylinder and for each of said operating points an optimum pilot quantity, it is possible to minimize operating noise over the entire operating range.

Operating points are selected in conventional and known manner by sampling the operating range. Such 0S sampling can take account, for example, of linear and/or non-linear operating zones of the engine.

The simplicity and the speed with which it is possible to determine the pilot quantity that solves the optimization problem makes it possible to envisage resetting the pilot quantities frequently so as to ensure that operating noise is controlled to be at about its minimum value over the entire operating range, as described below.

It should be observed that it is equivalent, for a cylinder:
a) to regulate combustion noise at about its minimum value;
b) to regulate the ratio $$\frac{\max\left(\frac{\partial P}{\partial \alpha_{pri}}\right)}{\max\left(\frac{\partial P}{\partial \alpha_{pil}}\right)}$$

at about k; or
c) to regulate the pilot quantity at about its optimum value.

Thus, in the description below, mention is made in equivalent manner to one or the other of the above assertions.

Figure 2:
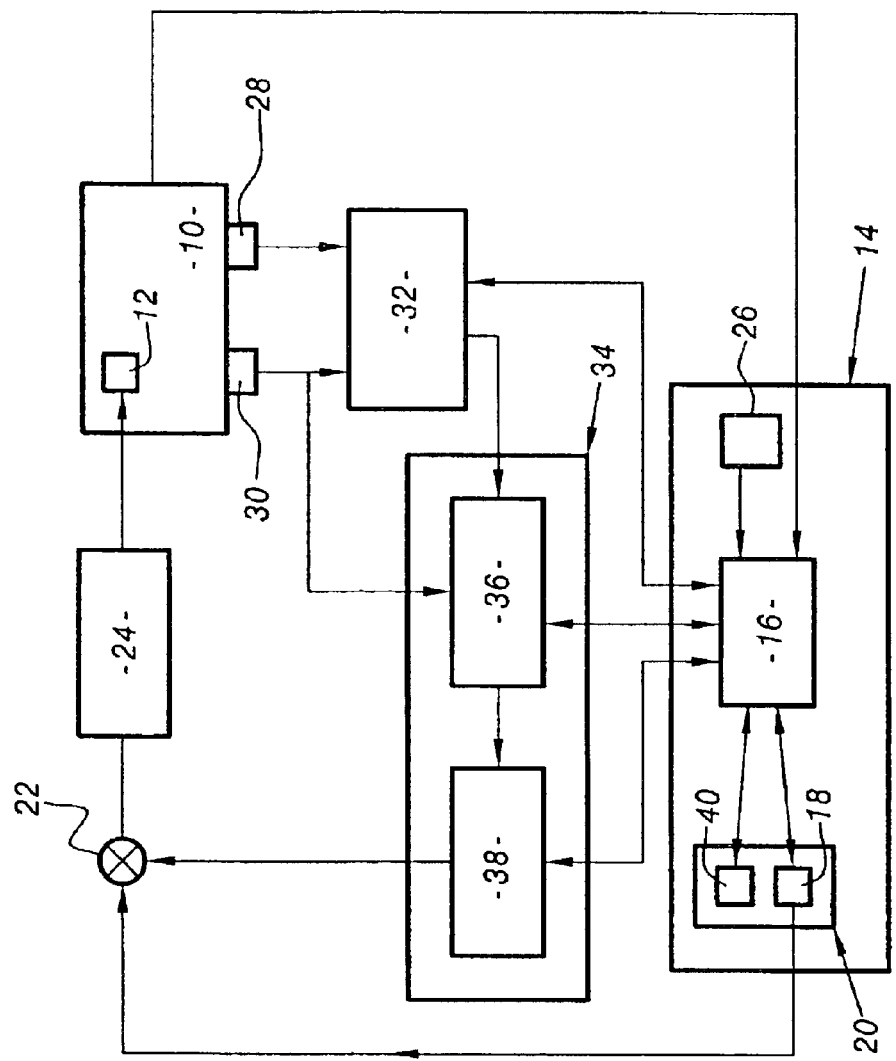
FIG. 2 is a block diagram of an embodiment of a system for controlling the operation of a motor vehicle diesel engine in accordance with the invention.

FIG. 2 is a block diagram of a system for controlling the operation of a motor vehicle diesel engine in accordance with the invention and based on the concepts described above.

Reference 10 designates a diesel engine that includes means 12 for injecting fuel by multiple injections and adapted to trigger the injection of fuel into each cylinder in the form of at least one pilot injection plus a main injection of fuel. By way of example, the diesel engine may be provided with a common delivery pipe for feeding fuel to the cylinders via controlled injectors.

Between two instants of resetting the pilot quantities, the pilot quantity injected into each cylinder and for each (speed, load) operating point of the engine is supplied by a data processing unit 14. This comprises a control unit 16 which receives as inputs information concerning the speed and the load of the diesel engine 10 in conventional manner. This control unit 16 interrogates mapping means 18 of a storage unit 20 as a function of the received speed and load information, and in response it receives a corresponding reference value for the pilot quantity for each of the cylinders, and it sends said value via an adder 22 to injector mapping means 24 which responds by delivering injection setpoint information to the feed means 12, in particular information relating to the quantity for each pilot injection.

For reasons of conciseness, the various means for controlling the quantities of fuel injected during main injection are not shown. As it is known in the field of controlling diesel engine injection, these quantities are also dependent on the operating point and they are determined as a function thereof.

The action of resetting the pilot quantities is activated regularly by a supervision unit 26 of the data processing unit 14. The supervision unit 26 sends a resetting request to the control unit 16 which then launches a procedure for determining the optimum pilot quantity for each cylinder and for at least one operating point of the engine. The pilot quantities for the cylinders are then determined sequentially, cylinder by cylinder, and independently of the other cylinders.

Each cylinder is associated with a pressure sensor 28 for measuring the pressure in the combustion chamber of the cylinder. The pressure sensor is conventional and may be incorporated in the combustion chamber, or it may be non-intrusive.

Means 30 for detecting the crank shaft angle of the engine are also provided. These means may be constituted, for example, by a Hall effect magnetic sensor provided with a toothed wheel associated with the engine shaft, as is known in the state of the art.

On the basis of the angle measurements delivered by the angle sensor, it is quite simple to deduce the crank shaft angle of each cylinder.

The pressure sensors 28 and the engine shaft angle sensor 30 are connected to means 32 for determining pressure gradients in the cylinders. These means 32 for determining pressure gradients are adapted to select a pressure signal coming from pressure sensors as a function of a cylinder selection signal delivered by the control unit 16 of the data processing unit 14, and to acquire a predefined fraction of this selected pressure signal while the crank shaft angle of the selected cylinder lies in a range of angles $[\alpha_d, \alpha_f]$. This range is delivered by the control unit 16, and ad is the start-of-acquisition angle for the pressure signal, while $\alpha_f$ is the end-of-acquisition angle for the pressure signal.

Typically, a value for $\alpha_d$ is −30° and a value for $\alpha_f$ is 40°, corresponding to a range representing the pilot injection stage and the main injection stage in the cycle of a cylinder. It is known that the pilot injection stage and the main injection stage take place over a range of crank shaft angles that is substantially equal to [−30°, +40°].

The means 32 for determining pressure gradients are also adapted to sample the selected pressure signal and to differentiate the sampled pressure signal digitally so as to obtain a sampled pressure gradient signal for the selected cylinder. Naturally, the pressure gradient may be acquired in analog manner and then sampled.

The pressure gradient signal is then supplied to a unit 34 for determining the pilot quantity. This unit 34 for determining the pilot quantity comprises a calculation unit 36 which receives, as input, the measured pressure gradient and the crank shaft angle in order to determine the pressure gradient maximum during the pilot injection stage and the pressure gradient maximum during the main injection stage. To do this, the calculation unit 36 receives as a second input the angle of advance of the main injection $\alpha_a$ from the control unit 16 and calculates the value of the maximum of the pressure gradient during the pilot injection stage $$\frac{\partial P}{\partial \alpha_{pil}}$$

as being the value of the pressure gradient maximum while the crank shaft angle is less than $\alpha_a$, i.e. while said angle lies in the range $[\alpha_d, \alpha_a]$, and it calculates the maximum of the pressure gradient during the main injection stage $$\frac{\partial P}{\partial \alpha_{pri}}$$

as being the value of the pressure gradient maximum while the crank shaft angle is greater than or equal to $\alpha_a$, i.e. while this angle lies in the range $[\alpha_a, \alpha_f]$. It should be observed that the particular bounds that are selected is not an essential characteristic, and the same results would be obtained for bounds that are slightly different.

This unit also calculates, on the basis of these two calculated maxima, the ratio $$R = \frac{\max\left(\frac{\partial P}{\partial \alpha_{pri}}\right)}{\max\left(\frac{\partial P}{\partial \alpha_{pil}}\right)}.$$

The values of the two pressure gradient maxima and the value of their ratio are then supplied to the control unit 16 to be stored in the storage means 20 for subsequent processing.

The unit 34 for determining the pilot quantity also comprises an optimizer unit 38 which receives the values for the pressure gradient maxima and the ratio, in order to determine an optimum value for the pilot quantity.

Until this value has been determined, the optimizer unit 38 regularly determines a new value for the pilot quantity which is delivered to the adder 22 for adding to the value coming from the mapping means 18. This unit 34 for determining the pilot quantity requires certain adjustment parameters that are a function of the (speed, load) operating point of the engine and possibly also of the selected cylinder. These adjustment parameters are read from a table 40 of parameters in the storage means 20 by the control unit 16 which sends them to the optimizer unit 38. The operation of searching for an optimum pilot quantity is described in greater detail below.

Once the value has been determined for the optimum pilot quantity, this value is delivered to the control unit 16 which updates the mapping means 18 correspondingly. An additional analysis of the results supplied by the unit 38 for determining the pilot quantity can be undertaken also for the purpose of updating the parameters in the parameter table 40.

Figure 3:
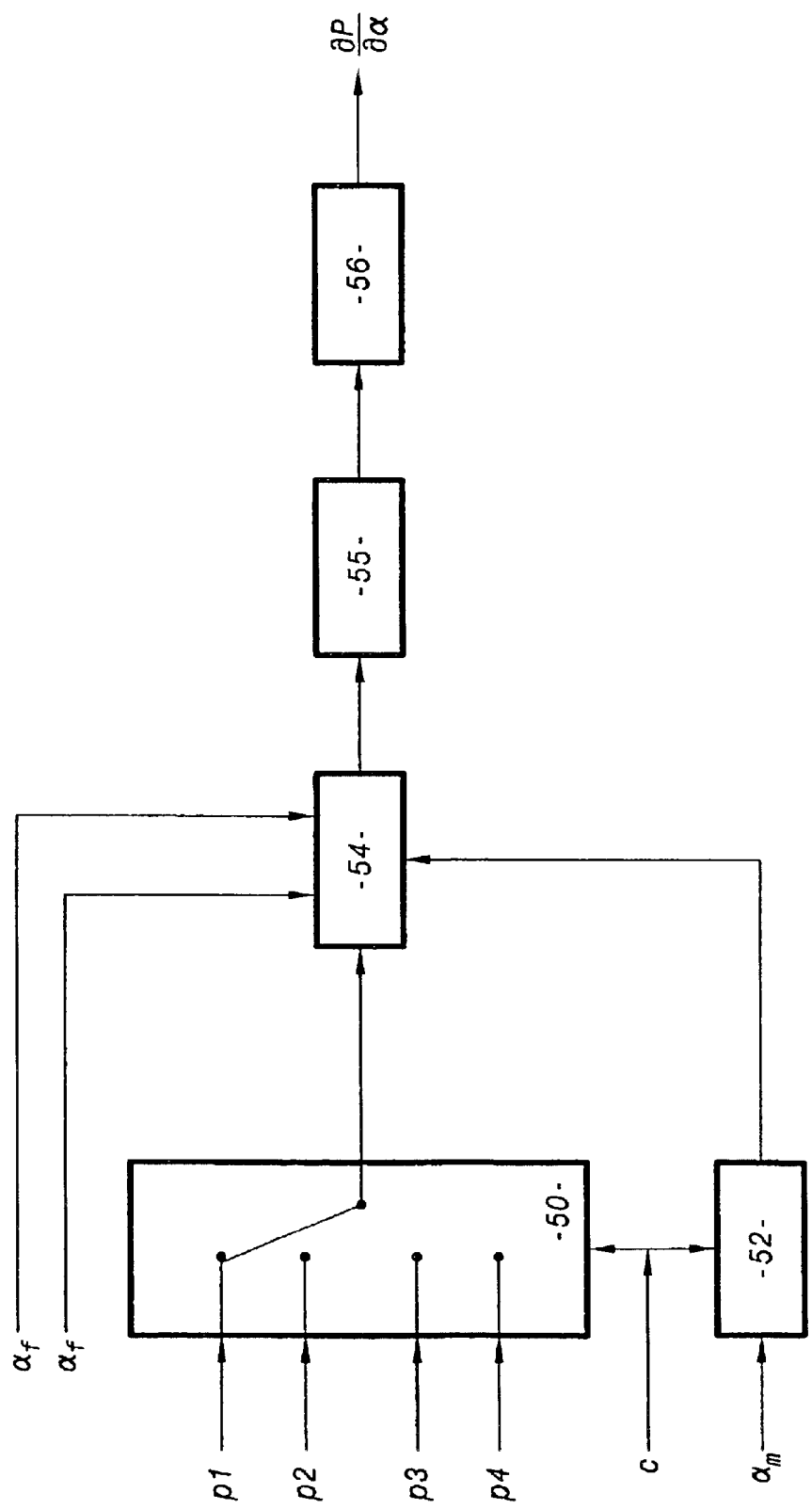
FIG. 3 is a block diagram of the means for determining pressure gradient in FIG. 2 and used in providing a system in accordance with the invention.

FIG. 3 shows an example of how the pressure gradient determining means of FIG. 2 can be implemented. Assuming that the diesel engine 10 has four cylinders, for example, the pressure gradient determining means receive as inputs four pressure signals p1, p2, p3, p4 coming from pressure sensors associated with the cylinders of the engine. These signals p1, p2, p3, p4 are supplied to controlled signal-selection means 50 adapted to select a pressure signal as a function of a cylinder-selection signal c which is delivered, as described above, by the control unit 16. These selector means 50 may comprise, for example, a conventional type of controlled switch.

Furthermore, the means for determining pressure gradients receive as another input the engine shaft angle signal $\alpha_m$ which is delivered to a controllable adder 52 adapted to determine the crank shaft angle of the selected cylinder by adding a value that is characteristic of the selected signal, and receiving as its other input signal the cylinder selection signal c.

The outputs from the selector means 50 and the adder 52 are connected to a windowing unit 54. As explained above, this windowing unit also receives as inputs from the control unit 16 the two angle values $\alpha_d$ and $\alpha_f$, being respectively the start-of-acquisition angle and the end-of-acquisition angle, and it selects that portion of the pressure signal which corresponds to the crank shaft angle lying in the range $[\alpha_d, \alpha_a]$.

An analog-to-digital converter 55 samples this signal with a predetermined crank shaft angle sampling period over the window that is determined by the selector means 50, e.g. 0.5°, so as to enable the signal to be processed digitally. It should be observed that the sampling is not necessarily at a constant rate. It is possible to devise a sampling relationship that samples the signal finely during time intervals in which the signal presents strong variations and that samples the signal more coarsely over time intervals in which the signal varies little. In general, adaptive sampling can be implemented as is known in the signal processing field.

The sampled signal is then supplied to a digital differentiation filter 56, preferably a filter having a finite impulse response, which calculates a digital derivative of the sampled pressure signal.

Figure 4:
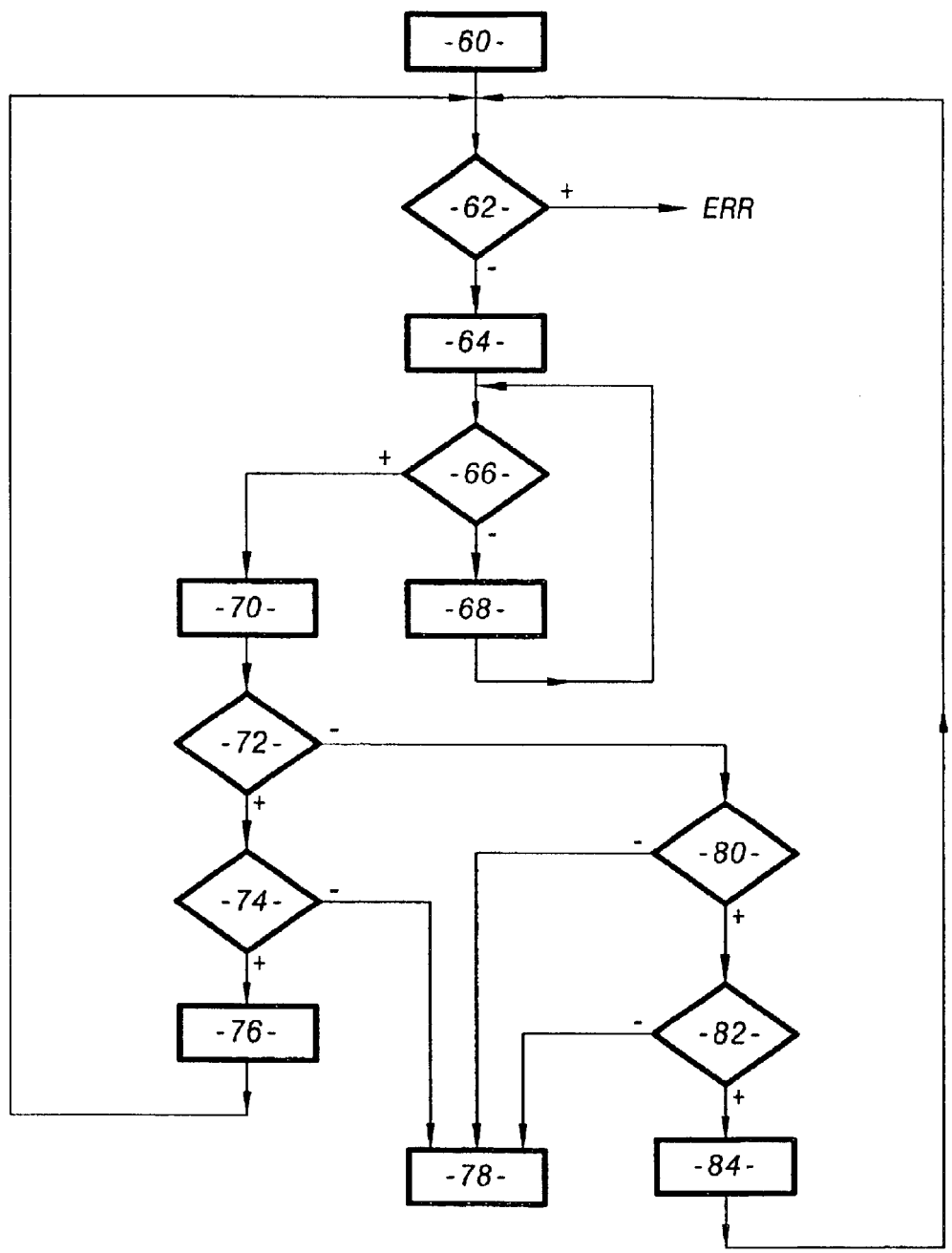
FIG. 4 is a flow chart of the algorithm for searching the optimum value for the pilot quantity as implemented in the system of the invention.

FIG. 4 is a flow chart showing the operation of the means for determining the pilot quantity as shown in FIG. 2 and how these means calculate a reference value for the optimum pilot quantity for a given cylinder, for a particular operating point, and for a quantity of fuel to be injected during the main injection stage that are all predetermined, the value of the pilot quantity injected into the other cylinders being fixed on predetermined values, namely the values stored in the mapping means 18.

In a step 60, a value for the injected pilot quantity $q_{pil}$ applied to the input of the adder 22 by the optimizer unit 38 is adjusted on a predetermined initial value. If determination is absolute, i.e. if the value of the pilot quantity sent from the mapping means 18 to the adder 22 is set on 0 while determining the pilot quantity, this initial value lies in the range $[q_{pil}^{min}, q_{pil}^{max}]$. By way of example, it may be the minimum value $q_{pil}^{min}$ or it may be the previously-calculated reference value for the cylinder in question. If the determination if relative, i.e. if the value sent to the adder 22 from the mapping means 18, written $q_{pil}^P$, for example, is non-zero, then the initial value $q_{pil}$ is set on a value lying in the range $[q_{pil}^{min}-q_{pil}^P, q_{pil}^{max}-q_{pil}^P]$ (it being understood that $q_{pil}^P$ actually lies in the range $[q_{pil}^{min}, n, q_{pil}^{max}]$) and this range is used as the search range. For reasons of conciseness, the description below gives details of an absolute search for optimum pilot quantity, but the invention is not restricted in any way thereto.

A test is implemented in a step 62 to determine whether the value $q_{pil}$ is greater than $q_{pil}^{max}$ or less than $q_{pil}^{min}$. If the result of this test is positive, an error message is generated and it is diagnosed that the engine is malfunctioning. If this result is negative, in a step 64, a cycle counter and two flags $q_{pil}^+$, and $q_{pil}^-$ are initialized at 1.

In a step 66, a test is performed to determine whether the value of the cycle counter, which serves to count cylinder cycles, is greater than or equal to a predetermined threshold value N+1. If the result of this test is negative, then in a step 68, the calculation unit 36 calculates and stores in the storage means 20 the value of the pressure gradient maximum $$\frac{\partial P}{\partial \alpha_{pil}}$$

during the pilot injection stage together with the value of the pressure gradient maximum $$\frac{\partial P}{\partial \alpha_{pri}}$$

during the main injection stage of the current cylinder cycle, together with the ratio $$R = \frac{\max\left(\frac{\partial P}{\partial \alpha_{pri}}\right)}{\max\left(\frac{\partial P}{\partial \alpha_{pil}}\right)}$$

of these two values.

In this same step, the cycle counter is incremented by an increment step of 1, and then the output from the step 68 is looped back to the input of step 66.

If the result of the test concerning the value of the cycle counter is positive, then a digital processing of the signal is implemented by the calculation unit 36 in a step 70 on the N most recently calculated values for $$\frac{\partial P}{\partial \alpha_{pil}}, \frac{\partial P}{\partial \alpha_{pri}},$$

and the ratio $$R = \frac{\max\left(\frac{\partial P}{\partial \alpha_{pri}}\right)}{\max\left(\frac{\partial P}{\partial \alpha_{pil}}\right)}.$$

This digital processing may consist in noise filtering, e.g. calculating a average value. It may also involve estimator means using noise models and/or engine models to obtain more effective filtering of the noise. Nevertheless, it is preferred to calculate the average after saturation since that makes it possible to limit the impact of ratios that are very small or very large, corresponding to irregularities in the operation of the engine, since digitally speaking this is more robust, faster, and does not use a model. Thus, after calculating the average value, three average values $\overline{P}_1$, $\overline{P}_2$ and $\overline{R}$ are obtained corresponding respectively to the average of the N most recent values for $$\frac{\partial P}{\partial \alpha_{pil}}, \frac{\partial P}{\partial \alpha_{pri}},$$

and R.

In a step 72, a first test is performed on the value $\overline{R}$ to determine whether the average value $\overline{R}$ is greater than or equal to a predetermined high threshold R_high for the ratio. If the result of this test is positive, a test is performed in step 74 to determine whether the value of the flag $q_{pil}^-$ is equal to 0. If the result of this test on the value $q_{pil}^-$ is positive, then in a step 76, the pilot quantity $q_{pil}$ injected into the cylinder is increased by one predetermined and positive pilot quantity increment step $\Delta q_{pil}$, and the value of the flag $q_{pil}^+$ is set to 0, after which the output from the step 76 is looped back to the input of the step 62.

If the result of this test on the value $q_{pil}^-$ is negative, then interpolation is performed in a step 78 in a manner that is explained below.

If the result of the first test on the value $\overline{R}$ is negative, a second test is performed on the value of $\overline{R}$ in a step 80 in order to determine whether the average value $\overline{R}$ is less than or equal to a predetermined low threshold value R_low. If the result of this test is positive, a test is performed in a step 82 to determine whether the value of $q_{pil}^+$ is equal to 0.

If the result of this test on the value $q_{pil}^+$ is positive, then in a step 84, the pilot quantity $q_{pil}$ injected into the cylinder is decreased by the pilot quantity increment step $\Delta q_{pil}$, the value of the flag $q_{pil}^-$ is set to 0, and then the output from the step 84 is looped back to the input of the step 62.

If the result of this test on the value of $q_{pil}^+$ is negative, interpolation is then implemented in step 78. If the result of the second test implemented in block 80 on the value $\overline{R}$ is negative, the same allocation verification is then implemented.

The interpolation in step 78 consists in calculating by interpolation a value for the optimum pilot quantity whenever the step 78 is accessed from the step 74 or the step 82. In those two cases, the range of acceptable values for $q_{pil}$ has been passed through using a stepsize that is too large, causing the range to be exceeded (upwards or downwards) without finding any optimum value. If the step 78 is accessed from the step 80, that means that a pilot quantity value has been determined that enables a ratio of pressure gradient maxima to be obtained that is close to 1. Under such circumstances, a test is implemented to determine whether the values $\overline{P}_1$, $\overline{P}_2$ satisfy relationship (4) of the optimization problem, i.e. whether $f(\overline{P}_1, \overline{P}_2)<0$. If the result of this test is positive, then the pressure gradient maxima values are acceptable for operation of the engine. Otherwise, the engine is malfunctioning, which can optionally lead to a switchover to operation in degraded mode for the engine.

The values for R_low and R_high are determined so as to take account of the noise/emission/robustness compromise, as is known in the field of adjusting engine combustion noise. These two values lie on either side of the reference value k for the noise/emission compromise as determined during calibration. The distances of these values from the reference value depend on the dispersion in the individual values of the ratio and of the robustness of emissions and of noise level when faced with small variations around the reference value.

The value N of the threshold for the cycle counter may be selected to be equal to 10, for example, which is sufficient to filter in satisfactory manner the noise and the instantaneous variations in combustion characteristics in the cylinder for which it is desired to determine the pilot quantity.

The advantage of the flags $q_{pil}^+$ and $q_{pil}^-$ is to avoid the algorithm oscillating and to provide a test which determines that searching should be stopped when it has not been possible to determine any satisfactory pilot value.

It should be observed that this algorithm makes it possible to calculate a pilot quantity such that $|q_{pil}-\overline{q}_{pil}| \leq \Delta q_{pil}$, where $\overline{q}_{pil}$ is the optimum pilot quantity. The value selected for $\Delta q_{pil}$ is determined so as to satisfy a compromise between accuracy and search time as is well known in the field of optimization.

Naturally, other search algorithms could be used, such as searching by dichotomy, or other forms of searching. It is also possible to use an algorithm for identifying the parameters of the thermodynamic model in accordance with relationship (3), such as a Kalman estimator, a maximum likelihood estimator, or some other form of estimator, and then to calculate the optimum pilot quantity from the corresponding optimization problem.

As can be seen, the number of operations implemented by the algorithm is small, so the associated computation time is negligible compared with the computation power of present controllers.

It can thus be seen that it is possible to implement a control law for the pilot quantity injected into each cylinder at high frequency, to regulate pilot quantity around the optimum quantity for each cylinder and for each operating point. Thus, the operating noise of the engine is constantly substantially equal to its minimum value, even if the mechanical and/or thermodynamic characteristics of the engine vary quickly over time.

Thus, for example, the control unit 16 can continuously monitor the value of the pressure gradient ratio and can supply this value to the supervisor unit 26. The supervisor unit 26 then implements a control strategy which can consist, for example, in launching a new search for the pilot quantity for injection into the cylinders as soon as the value of the gradient ratio ceases to lie within a predetermined range of acceptable values.

The supervisor unit 26 may also be adapted to trigger resetting whenever a time interval has elapsed since the most recent reset, or whenever some predetermined number of kilometers has been traveled since the most recent reset.

As can be seen, no mathematical model of the engine or of a human ear is used for determining the optimum pilot quantity. The system of the invention thus makes it possible to calculate this quantity robustly in the face of varying mechanical and/or thermodynamic characteristics of engines. This system also makes it simple to diagnose the state of the engine. As mentioned above, the amount of computation required is small which means that all of the computation can be performed by a low resource calculator, or that all of the operations can be implemented by a hard-wired circuit specially designed for this purpose.

Naturally other embodiments are possible, such as, for example, determining the pilot quantity using analog means, and multiple variations can be devised by the person skilled in the art without going beyond the scope of the present invention.

What is claimed is:

1. A system of controlling the combustion noise of a motor vehicle diesel engine, the engine being of the type including feeding means for feeding each of its cylinders with multiple injections of fuel, and adapted to trigger fuel feed to each cylinder using at least one pilot injection followed by a main injection of fuel, wherein the system comprises:

means for determining pressure gradients in the cylinder of the engine while it is in operation, at least during the pilot and main injection stages; and means for determining the quantity of fuel to be injected into the cylinder during pilot injection for a predetermined quantity of fuel to be injected during main injection so as to optimize an operating criterion of the cylinder based on the ratio between the pressure gradients corresponding to the pilot and main injection stages, and thus optimize the operating noise of the engine.

2. System according to claim 1, wherein the means for determining the quantity of fuel to be injected into the cylinder during pilot injection are adapted to implement an optimization algorithm to determine a quantity of fuel for injection per cylinder during pilot injection according the following relationships:

$$\min_{q_{pil} \in Q_{pil}} \left| \frac{\max\left(\frac{\partial P}{\partial \alpha_{pil}}\right)}{\max\left(\frac{\partial P}{\partial \alpha_{pri}}\right)} - k \right|$$

$$f\left(\max\left(\frac{\partial P}{\partial \alpha_{pil}}\right), \max\left(\frac{\partial P}{\partial \alpha_{pri}}\right)\right) < 0$$

where $q_{pil}$ is the quantity of fuel injected into a cylinder during pilot injection, $Q_{pil}$ is a predetermined range of acceptable values for $q_{pil}$, $\alpha$ is the crank shaft angle of the cylinder, $$\frac{\partial P}{\partial \alpha_{pil}}$$

is the pressure gradient in the cylinder during the pilot injection stage of the cylinder cycle, $$\frac{\partial P}{\partial \alpha_{pri}}$$

is the pressure gradient in the cylinder during the main injection stage of the cylinder cycle, k is a reference value fixed during calibration, and $$f\left(\max\left(\frac{\partial P}{\partial \alpha_{pil}}\right), \max\left(\frac{\partial P}{\partial \alpha_{pri}}\right)\right) < 0$$

is a function characteristic of a predetermined allocation zone of acceptable values for the pair of values $$\left(\max\left(\frac{\partial P}{\partial \alpha_{pil}}\right), \max\left(\frac{\partial P}{\partial \alpha_{pri}}\right)\right).$$

3. System according to claim 2, wherein the means for determining the quantity of fuel to be injected into the cylinder during pilot injection are adapted to implement an optimization algorithm which comprises:
   a step of acquiring at least one pressure gradient signal representative of variation in the pressure gradient during a cylinder cycle, for a constant quantity of fuel being injected during the pilot stage;
   a step of calculating a value $\overline{R}$ representative of the ratio $$\frac{\max\left(\frac{\partial P}{\partial \alpha_{pil}}\right)}{\max\left(\frac{\partial P}{\partial \alpha_{pri}}\right)}$$

for the cylinder and the constant quantity of injected fuel considered as a function of at least one acquired pressure gradient signal; and
   a step of determining variation in the quantity of fuel injected into the cylinder during the pilot stage as a function of the calculated value $\overline{R}$, in application of a predetermined relationship for travel through the predetermined set of acceptable values for the quantity of fuel injected during pilot injection.

4. System according to claim 3, wherein the relationship for travel through the predetermined set of acceptable values of quantities of fuel for injection during pilot injection is determined by the characteristics of a thermodynamic model using the relationship:

$$\max\left(\frac{\partial P}{\partial \alpha_{pri}}\right) = h\left(\max\left(\frac{\partial P}{\partial \alpha_{pil}}\right)\right)$$

where h is the thermodynamic model representative of variation in the value of the pressure gradient maximum in a cylinder during the main injection stage as a function of the values of the pressure gradient maximum in the cylinder during the pilot injection stage.

5. System according to claim 1, wherein it includes a pressure sensor associated with each cylinder and connected to the means for determining pressure gradients.

6. System according to claim 1, wherein it includes means for acquiring the engine shaft angle, which means are connected to the means for determining pressure gradients.

7. System according to claim 1, wherein it includes a pressure sensor associated with each cylinder and means for acquiring the engine shaft angle connected to the means for determining pressure gradients, and wherein the means for determining pressure gradients comprise:
   signal selection means for selecting a cylinder pressure signal selected from a plurality of cylinder pressure signals;
   acquisition windowing means for acquiring the selected cylinder pressure signal delivered by the associated pressure sensor while the cylinder crank shaft angle lies within a predetermined acquisition range of crank shaft angles representative of the pilot injection stage and the main injection stage of the cylinder cycle;
   an analog-to-digital converter for sampling the pressure signal output by the windowing means in application of a predetermined sampling relationship; and
   a differentiation digital filter adapted to determine a digital derivative of the sampled pressure signal and thus obtain the cylinder pressure gradient signal.

8. System according to claim 7, wherein the differentiation digital filter is a digital filter having finite impulse response.

9. A system according to claim 7, wherein the means for determining the quantity of fuel for injection into the cylinder comprise calculation means adapted to calculate and store on each cylinder cycle: the value $$\max\left(\frac{\partial P}{\partial \alpha_{pil}}\right)$$

as being the maximum value of the pressure gradient signal in the crank shaft angle range between the beginning of the acquisition crank shaft angle range and the advance angle for main injection; the value $$\max\left(\frac{\partial P}{\partial \alpha_{pri}}\right)$$

as being the maximum value of the pressure gradient signal in the crank shaft angle range between said main injection advance angle and the end of the acquisition crank shaft angle range; and the value of the ratio $$R = \frac{\max\left(\frac{\partial P}{\partial \alpha_{pil}}\right)}{\max\left(\frac{\partial P}{\partial \alpha_{pri}}\right)}.$$

10. System according to claim 2, wherein the function characteristic of the predetermined allocation zone is determined as a function of an operating noise score of the engine depending on the pressure gradients corresponding to the pilot and main injection stages in accordance with the relationship:

$$\text{Score} = \lambda + \beta \times \max\left(\max\left(\frac{\partial P}{\partial \alpha_{pil}}\right), \max\left(\frac{\partial P}{\partial \alpha_{pri}}\right)\right)$$

where $\lambda$ and $\beta$ are experimentally-determined parameters.

11. System according to claim 1, wherein the means for determining the quantity of fuel to be injected into the cylinder during pilot injection are adapted to determine sequentially the quantity of fuel to be injected into each cylinder independently of the others.

12. System according to claim 1, wherein it includes control means adapted to control the feed means to calculate the quantity of fuel to be injected during pilot injection in a cylinder in such a manner as to regulate the value of the ratio $$\frac{\max\left(\frac{\partial P}{\partial \alpha_{pil}}\right)}{\max\left(\frac{\partial P}{\partial \alpha_{pri}}\right)}$$

in the cylinder to around a reference value k so as to minimize operating noise of the engine.

* * * * *